United States Patent Office 2,829,152
Patented Apr. 1, 1958

2,829,152

STABILIZATION OF ACRYLONITRILE

Robert Y. Garrett, Akron, Ohio, and John M. Whitney, Calvert City, Ky., assignors to The B. F. Goodrich Company, New York, N. Y., a corporation of New York No Drawing. Application March 20, 1956
Serial No. 572,617

6 Claims. (Cl. 260—465.9)

This invention relates to stabilized acrylonitrile and to a method for stabilizing and inhibiting the polymerization of acrylonitrile during storage and processing.

Acrylonitrile, like many unsaturated monomers has a tendency to polymerize on storage, particularly under the influence of oxygen and heat. It is an object of this invention to provide stable acrylonitrile compositions and to provide a method for preventing the polymerization of acrylonitrile during processing and extended periods of storage and shipment, even in the presence of oxygen and under elevated temperature conditions. It is one of the prime prerequisites of a polymerization inhibitor that such material does not substantially interfere with the polymerization characteristics of the monomer containing the inhibitor. Otherwise, expensive and time consuming operations are often necessary to remove the inhibitor from the acrylonitrile. It is accordingly another object of this invention to provide acrylonitrile compositions which are stable under storage and shipping conditions, which also are readily polymerized by the usual techniques employed for polymerizing acrylonitrile.

It has now been discovered that tetraalkyl thiuram monosulfides of the formula

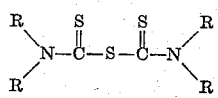

wherein R represents an alkyl radical containing 1 to 4 carbon atoms, will inhibit the polymerization of acrylonitrile during processing and under storage conditions for long periods of time even in the presence of impurities which accelerate the polymerization of acrylonitrile, oxygen and at high temperatures of storage. Further, it has been found quite unexpectedly, that the presence of small amounts of the tetraalkyl thiuram monosulfide has no appreciable effect upon the polymerization rate of the acrylonitrile, even in emulsion systems with the normal alkali metal persulfate, hydrogen peroxide, organic peroxide and organic hydroperoxide catalysts at low or high temperatures. The tetraalkyl thiuram inhibitor is also useful for protecting acrylonitrile from polymerizing during such preparatory steps as distillation.

The amount of tetraalkyl thiuram monosulfide employed may be varied from about 1 to about 1000 parts per million of acrylonitrile. Ordinarily the amount of tetraalkyl thiuram monosulfide employed will be varied from about 1 to about 300 parts per million and more preferably from about 5 to 150 parts per million. Of the tetraalkyl thiuram monosulfides employed, tetramethyl thiuram monosulfide is preferred, used in acrylonitrile in concentrations from about 5 to about 50 parts per million.

To demonstrate the stabilizing and inhibiting characteristics of the tetraalkyl thiuram monosulfide in acrylonitrile, an accelerated aging test is employed. 40 grams of acrylonitrile, containing 1.96 weight percent of acetaldehyde to accelerate the polymerization of the acrylonitrile, are charged to an oxygen bomb which is pressured to 100 pounds with oxygen. The sealed bomb is then heated to 100° C. The following data are obtained with the stated concentrations of inhibitor in parts per million:

| Concentration of Inhibitor, p. p. m. | Time required for Polymerization |
|---|---|
| 0 | 25 minutes. |
| 5 | 3.5 hours. |
| 10 | None after 4 hours. |
| 50 | Do. |
| 100 | Do. |

In the case of no inhibitor, less than 25 minutes were required for the acrylonitrile to polymerize to a solid form. The test was stopped at the end of 4 hours and no polymermization occurred in the case of 10, 50 and 100 p. p. m. of inhibitor. This accelerated aging test is quote drastic and when the experiment using 5 parts per million of tetramethyl thiuram monosulfide is employed with acrylonitrile which does not contain acetaldehyde, the time required for polymerization is many times greater than 4 hours.

In another series of experiments the above-described test is applied to acrylonitrile containing other inhibitors which have been reported in the literature for use in acrylonitrile. These include hydroquinone, tertiarybutyl catechol, phenyl beta-naphthylamine and the monobenzyl ether of hydroquinone. The table below shows the concentration and the stability of the compositions:

| Inhibitor | Concentration of Inhibitor, p. p. m. | Time required for Polymerization |
|---|---|---|
| None | 0 | 20 to 30 minutes. |
| Hydroquinone | 50 | 55 minutes. |
| Tertiary Butyl Catechol | 50 | 1 hour 55 minutes. |
| Hydroquinone Monobenzyl Ether | 50 | 1.5 hours. |
| Phenyl Betanaphthylamine | 50 | 2.5 hours. |
| Tetramethyl Thiuram Monosulfide | 50 | None after 4 hours. |

The effectiveness of the tetraalkyl thiuram monosulfides as polymerization inhibitors for acrylonitrile under extremely accelerated conditions as compared to the conventional inhibitor of the prior art is evident. Under more normal storage conditions, the inhibitory activity of the tetraalkyl thiuram monosulfide is even more marked. Under normal storage conditions these inhibitors are effective over prolonged storage periods under adverse conditions.

Many monomer polymerization inhibitors, because of the adverse effect even in small amounts on the polymerization properties and reaction rates of the monomer, must be removed prior to polymerization of the monomer. Hydroquinone and t-butyl catechol are standard stabilizers for unsaturated monomers. These are ordinarily removed from the monomer by washing with caustic solution. Such a technique is not economically applied to acrylonitrile because of the solubility of acrylonitrile in water, resulting in loss of expensive monomer. The inhibitor of this invention when present in acrylonitrile in the defined ranges may be left in the acrylonitrile which can be polymerized satisfactorily as received.

In a standard aqueous emulsion polymerization of a monomer mixture containing about 55 parts of butadiene-1,3, 45 parts of acrylonitrile containing 55 parts per million of tetramethyl thiuram monosulfide per 100 weight parts of acrylonitrile, 190 parts of water, fatty acid soap and a hydrogen peroxide-heavy metal catalyst, no appreciable effect on polymerization rate as compared to uninhibited acrylonitrile was noted. When more than about 100 parts per million, 135, of tetramethyl thiuram monosulfide per 100 weight parts of acrylonitrile are used a small increase in overall reaction time required to convert more than 90% of the monomers to polymer is observed. The higher concentrations of inhibitor may cause some decrease in polymerization rate but this may be offset by varying polymerization conditions including the use of more active polymerization initiators. For example, using an alkyl amine-potassium persulfate catalyst system in the above recipe, polymerization was essentially completed in 12 hours in the presence of 300 parts per million of tetramethyl thiuram monosulfide, 14 hours with 500 parts and 18 hours with 1000 parts per million of the inhibitor. These reaction rates are quite satisfactory for use in production. In fact, it often is desirable to have slower polymerization reaction rates.

The stabilized and inhibited acrylonitrile compositions of this invention have no noticeable odor or color contributable to the inhibitor. The inhibitor employed is economical both as to initial cost, may be used in very low concentrations, and is readily available. When other tetraalkyl thiuram monosulfides such as the tetraethyl thiuram monosulfide, the diethyl dimethyl thiuram monosulfide and the like are employed similar excellent inhibiting action is obtained.

We claim:

1. As a composition of matter acrylonitrile containing dissolved therein from about 1 to 1000 parts per million of a tetraalkyl thiuram monosulfide of the formula

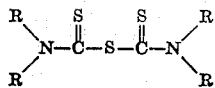

wherein R is an alkyl radical containing 1 to 4 carbon atoms.

2. As a composition of matter acrylonitrile containing dissolved therein from about 1 to about 150 parts per million of tetramethyl thiuram monosulfide dissolved therein.

3. As a composition of matter acrylonitrile containing from about 5 to about 50 parts per million of tetramethyl thiuram monosulfide.

4. The method of inhibiting the polymerization of acrylonitrile which comprises incorporating therein from about 1 to 1000 parts per million of a tetraalkyl thiuram monosulfide of the formula

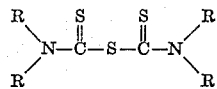

wherein R is an alkyl radical containing 1 to 4 carbon atoms.

5. The method of inhibiting the polymerization of acrylonitrile which comprises incorporating therein from about 1 to about 150 parts per million of tetramethyl thiuram monosulfide.

6. The method of inhibiting the polymerization of acrylonitrile which comprises incorporating therein from about 5 to about 50 parts per million of tetramethyl thiuram monosulfide.

References Cited in the file of this patent

UNITED STATES PATENTS 2,232,785    Howk _____ Feb. 25, 1941

OTHER REFERENCES

Frank et al.: Jour. Am. Chem. Soc., vol. 68, p. 908 (1946).
Kaneko et al.: Chem. Abst., vol. 44, col. 9717 (1950).
Okita et al.: Chem. Abst., vol. 45, col. 6420 (1951).
Kern: J. A. C. S. 77, 1382–3 (March 5, 1955).